United States Patent
SeeToh et al.

(10) Patent No.: US 6,765,763 B2
(45) Date of Patent: Jul. 20, 2004

(54) ACTUATOR SYSTEM FOR DISC DRIVE

(75) Inventors: CheeWai SeeToh, Singapore (SG); WaiOnn Chee, Singapore (SG); Jierapipatanakul Niroot, Singapore (SG); Andre Yl Liem, Singapore (SG); Michael JooChiang Toh, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 172 days.

(21) Appl. No.: 09/879,359

(22) Filed: Jun. 11, 2001

(65) Prior Publication Data

US 2001/0053047 A1 Dec. 20, 2001

Related U.S. Application Data

(60) Provisional application No. 60/212,541, filed on Jun. 20, 2000, and provisional application No. 60/212,216, filed on Jun. 16, 2000.

(51) Int. Cl.$^7$ .......................... G11B 5/55; G11B 21/08
(52) U.S. Cl. .............................. 360/264.2; 360/244.1; 360/245.9
(58) Field of Search ................... 360/244.1, 264.2, 360/245.9, 97.01; 439/67

(56) References Cited

U.S. PATENT DOCUMENTS

| | | | |
|---|---|---|---|
| 5,014,145 A | | 5/1991 | Hosokawa et al. |
| 5,055,969 A | | 10/1991 | Putnam |
| 5,103,359 A | * | 4/1992 | Marazzo .................. 360/264.2 |
| 5,404,636 A | | 4/1995 | Stefansky et al. |
| 5,422,764 A | * | 6/1995 | McIlvanie ................ 360/97.01 |
| 5,495,375 A | | 2/1996 | Baasch et al. |
| 5,495,377 A | | 2/1996 | Kim |
| 5,600,516 A | | 2/1997 | Phillips et al. |
| 5,631,788 A | | 5/1997 | Richards |

(List continued on next page.)

FOREIGN PATENT DOCUMENTS

| | | | | |
|---|---|---|---|---|
| EP | 0764942 A1 | | 3/1997 | |
| JP | 59168906 A | * | 9/1984 | ............ G11B/5/02 |
| JP | 02166678 A | * | 6/1990 | ............ G11B/21/02 |
| JP | 03272015 A | * | 12/1991 | ............ G11B/5/60 |
| JP | 06084302 A | * | 3/1994 | ............ G11B/21/02 |
| JP | 06195668 A | * | 7/1994 | ............ G11B/5/60 |
| JP | 07262540 A | * | 10/1995 | ............ G11B/5/60 |
| JP | 07282551 A | * | 10/1995 | ............ G11B/21/02 |
| JP | 08106617 A | * | 4/1996 | ............ G11B/5/53 |
| JP | 10092125 A | * | 4/1998 | ............ G11B/21/02 |
| JP | 11238218 A | * | 8/1999 | ............ G11B/5/60 |
| JP | 11306703 A | * | 11/1999 | ............ G11B/21/21 |
| WO | WO 02/17319 A1 | | 2/2002 | |

OTHER PUBLICATIONS

"Actuator Assembly for a Disk File", Oct. 1, 1977, IBM Technical Disclosure Bulletin, vol. No. 20, Iss. No. 5, pp. 1984–1985.*

"Magnetic Recording Head/Suspension Array", Sep. 1, 1993, IBM Technical Disclosure Bulletin, vol. No. 36, Iss. No. 9A, pp. 7–8.*

*Primary Examiner*—William Klimowicz
(74) *Attorney, Agent, or Firm*—Derek J. Berger

(57) ABSTRACT

An actuator assembly of a disc drive having an actuator arm rotatably mounted adjacent a data disc. The actuator arm has a top surface and a bottom surface, and includes a head gimbal assembly support portion located at one end of the actuator arm. The actuator assembly further includes an arm circuit fastened to the top surface of the actuator arm. The actuator assembly may additionally include a head gimbal assembly that electrically couples the data transducer and the arm circuit. The gimbal circuit is partially routed along the head gimbal assembly and over the top surface of the actuator arm. Alignment apertures on the arm circuit and the head gimbal circuit and alignment pins on the actuator arm may be used for positioning of the circuits over the top surface of the actuator arm.

30 Claims, 5 Drawing Sheets

U.S. PATENT DOCUMENTS

| | | | |
|---|---|---|---|
| 5,644,452 A | * 7/1997 | Cox et al. | 360/264.2 |
| 5,655,285 A | 8/1997 | Bonn et al. | |
| 5,675,455 A | 10/1997 | Matsumoto | |
| 5,675,456 A | * 10/1997 | Myers | 360/265.6 |
| 5,680,277 A | 10/1997 | Bonn et al. | |
| 5,708,541 A | * 1/1998 | Erpelding | 360/264.2 |
| 5,745,319 A | 4/1998 | Takekado et al. | |
| 5,754,372 A | 5/1998 | Ramsdell et al. | |
| 5,781,380 A | * 7/1998 | Berding et al. | 360/264.2 |
| 5,808,835 A | 9/1998 | Fujiwara | |
| 5,860,206 A | 1/1999 | Tochiyama | |
| 5,862,019 A | 1/1999 | Larson | |
| 5,864,441 A | 1/1999 | Coffey et al. | |
| 5,946,163 A | 8/1999 | Boutaghou et al. | |
| 5,961,334 A | * 10/1999 | Inaba | 439/67 |
| 6,018,439 A | * 1/2000 | Forbord et al. | 360/264.2 |
| 6,018,441 A | * 1/2000 | Wu et al. | 360/265.6 |
| 6,025,988 A | * 2/2000 | Yan | 361/685 |
| 6,477,016 B1 | * 11/2002 | Yamaguchi et al. | 360/264.2 |

* cited by examiner

ACTUATOR SYSTEM FOR DISC DRIVE

RELATED APPLICATION

This application claims priority of U.S. provisional application Serial No. 60/212,541 filed Jun. 20, 2000 and U.S. provisional application Serial No. 60/212,216 filed Jun. 16, 2000.

FIELD OF THE INVENTION

The present invention relates to an actuator assembly for a disc drive, and more specifically to disc drives utilizing alignment pins and alignment apertures in "top-down" assembly of actuator arm configurations.

BACKGROUND OF THE INVENTION

Disc drives are data storage devices that store digital data in magnetic form on a storage medium on a rotating data disc. Modern disc drives comprise one or more rigid data discs that are coated with a magnetizable medium and mounted on the hub of a spindle motor for rotation at a constant high speed. An array of data transducers are mounted to an actuator arm and a servo system is used to move the actuator arm such that a particular transducer is positioned over a desired location for writing or reading information to and from the disc. During a write operation, the transducer writes data onto the disc and during a read operation the transducer senses the data previously written on the disc and transfers the information to an external environment.

There is a continuing push for disc drives with smaller physical dimensions. Smaller sized disc drives, however, are generally difficult to manufacture due to the complex assembly of conventional disc drives. Typical disc drives, for example, include a multiple arm housing that allows multiple head gimbal assemblies to be attached. A coil in a voice coil motor is generally attached to the housing by either adhesive bonding or overmolding. Moreover, a bearing cartridge and side mounted pre-amplifier circuit is also typically attached to the housing. Such arrangements tend to increase the physical size of conventional disc drives to greater than desirable dimensions.

SUMMARY

Embodiments of the present invention solve the above and other problems by mounting an arm circuit in a "top-down" configuration on the top or bottom surface of an actuator arm using alignment pins and alignment apertures. Thus, an embodiment generally involves an actuator assembly for reading and writing data from and to a data disc. The actuator assembly includes an actuator arm rotatably mounted adjacent the data disc. The actuator arm has a top surface and a bottom surface, and includes a head gimbal assembly support portion located at one end of the actuator arm. The actuator assembly includes an arm circuit fastened to the top surface of the actuator arm. The actuator assembly further includes an arm circuit alignment aperture on the arm circuit and an arm circuit alignment pin on the actuator arm. The arm circuit alignment aperture receives the arm circuit alignment pin for positioning of the arm circuit on the top surface of the actuator arm.

The actuator assembly includes a head gimbal assembly. The head gimbal assembly is fastened to the head gimbal assembly support portion of the actuator arm and contains a data transducer for writing and reading data to and from the data disc. Furthermore, the actuator assembly may include a gimbal circuit that electrically couples the data transducer and the arm circuit. The gimbal circuit is partially routed along the head gimbal assembly and over the top surface of the actuator arm. The actuator assembly in accordance with an embodiment also includes a gimbal circuit alignment aperture on the gimbal circuit and a gimbal circuit alignment pin on the actuator arm. The gimbal circuit alignment aperture receives the gimbal circuit alignment pin to position of the gimbal circuit accurately over and on the top surface of the actuator arm. The head gimbal assembly can then be swaged, laser-welded, or screw mounted to the actuator arm.

These and various other features as well as advantages, which characterize an embodiment of the present invention, will be apparent from a reading of the following detailed description and a review of the associated drawings.

DETAILED DESCRIPTION

Figure 1:
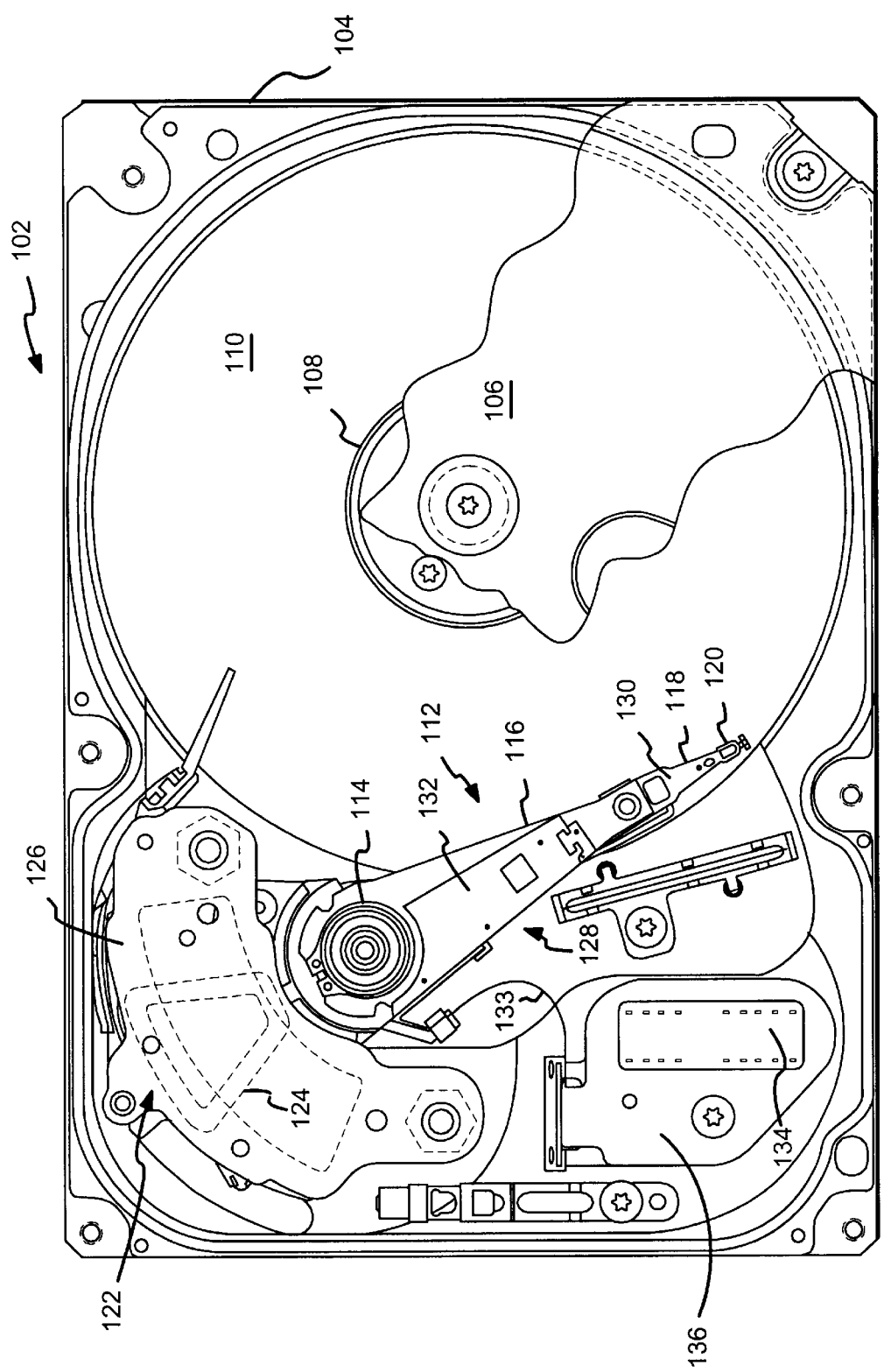
FIG. 1 shows a disc drive constructed in accordance with one embodiment of the present invention.

Embodiments of the invention are described in detail below with reference to the figures. When referring to the figures, like structures and elements shown throughout are indicated with like reference numerals.

A disc drive 102 constructed in accordance with an embodiment of the present invention is shown in FIG. 1. The disc drive 102 includes a base 104 to which various components of the disc drive are mounted. A top cover 106, shown partially cut away, cooperates with the base 104 to form an internal field environment for the disc drive in a conventional manner. The components of the disc drive 102 include a spindle motor 108 which rotates one or more discs 110 at a constant high speed. Information is written to and read from tracks on the discs 110 through the use of an actuator assembly 112, which rotates during a seek operation about a bearing shaft assembly 114 positioned adjacent to the discs 110. The actuator assembly 112 includes one or more actuator arms 116 which extend toward the discs 110, with one or more head gimbal assemblies 118 extending from a proximate end of each of the actuator arms 116. Mounted at one end of each of the head gimbal assemblies 118 is at least one data transducer 120 which includes an air-bearing slider enabling the transducer 120 to fly in close proximity above the corresponding surface of the associated disc 110.

During a seek operation, the track position of the data transducers 120 is controlled through the use of a voice coil motor (VCM) 122, which typically includes an actuator coil 124 attached to the actuator assembly 112, as well as one or more permanent magnets 126 establishing a magnetic field in which the actuator coil 124 is immersed. Controlled application of current to the actuator coil 124 causes magnetic interaction between the permanent magnets 126 and the actuator coil 124 so that the actuator coil 124 moves in accordance with the well known Lorentz relationship. As the actuator coil 124 moves, the actuator assembly 112 pivots about the bearing shaft assembly 114, and the data transducers 120 are caused to move across the surfaces of the discs 110.

As discussed in greater detail below, a circuit assembly 128 provides the requisite electrical connection paths for the actuator assembly 112 while allowing pivotal movement of the actuator assembly 112 during operation. The circuit assembly 128 includes an L-shaped gimbal circuit 130 coupled with the data transducer 120 and partially routed along the head gimbal assembly 118. An arm circuit 132, coupled with the gimbal circuit 130, is mounted on the actuator arm 116. The arm circuit 132 typically includes circuitry for controlling write currents applied to the data transducer 120 during write operations and preamplifiers for amplifying read signals generated by the data transducer 120 during read operations. The arm circuit is comprised of a flexible ribbon lead portion 133 and a signal conditioning portion 132. The flexible ribbon lead portion 133 of the arm circuit is connected to the signal conditioning portion 132 and a flex connector 134 to electrically couple the signal conditioning portion 132 to the flex connector 134. The flex connector 134 electrically couples the arm circuit 132 to the printed circuit board (not shown) and may be supported by a flex bracket 136 rigidly mounted on to the base 104. The arm circuit 132 communicates signals through the flex connector 134 to the disc drive printed circuit board (not shown) mounted to the bottom side of the disc drive 102.

Figure 2:
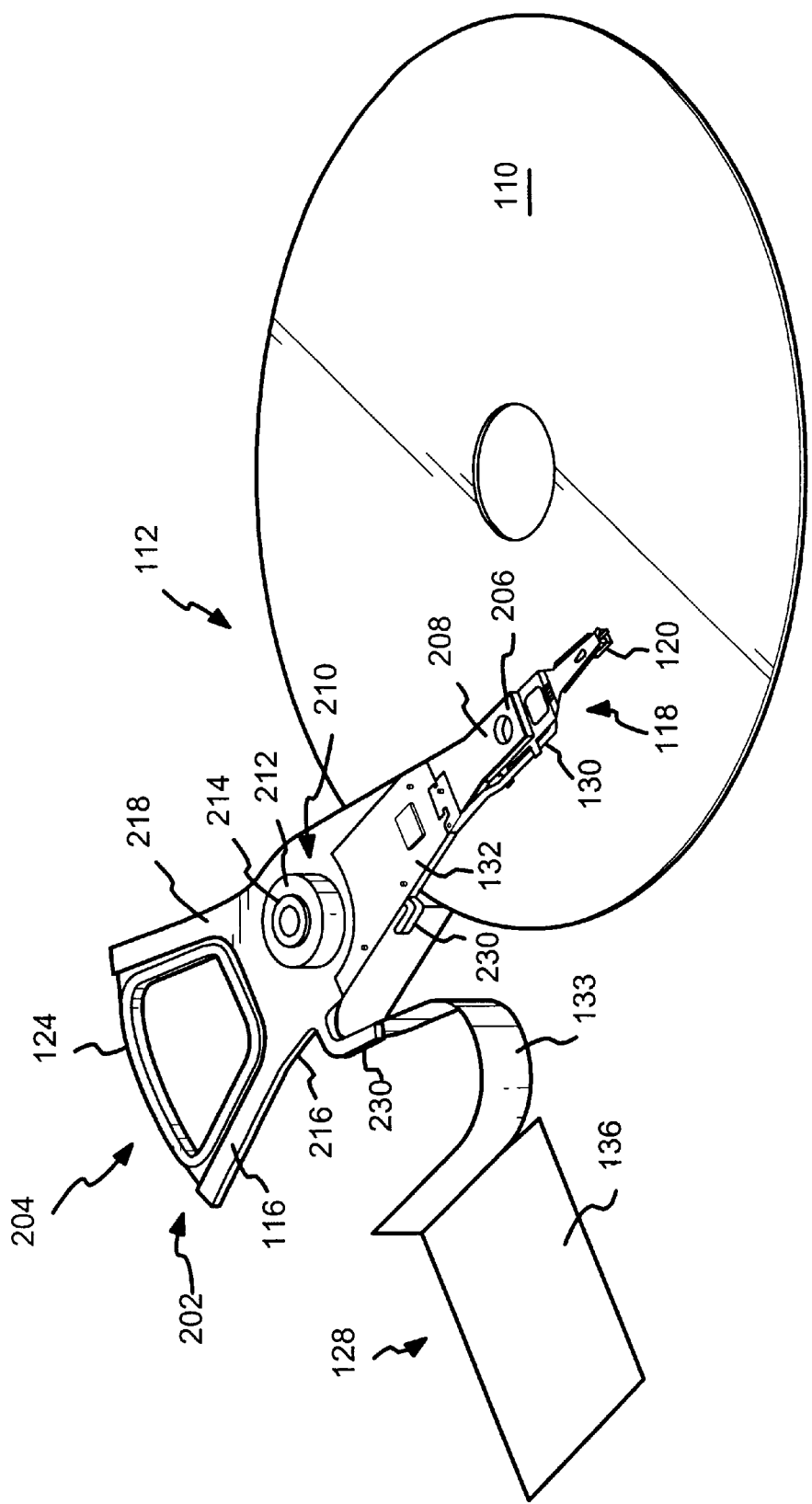
FIG. 2 is a perspective view of the actuator assembly removed from the disc drive shown in FIG. 1.

In FIG. 2, one embodiment of the actuator assembly 112 in accordance with the present invention is shown. The actuator assembly 112 includes an elongated actuator arm 116 for moving the data transducer 120 across the data disc 110. The actuator arm 116 is preferably constructed from a lightweight material to reduce inertial forces during arm movement. For example, the actuator arm 116 can be fabricated from aluminum or a hard plastic. In one embodiment of the present invention, the actuator arm 116 is formed by a sheet metal stamping technique which achieves lightweight, low inertia and low profile arm properties. Fabricating the actuator arm 116 to the desired shape and size by sheet metal stamping is generally less time-consuming and less expensive than conventional machining approaches to forming an actuator arm.

The actuator arm 116 includes a substantially V-shaped coil support portion 202 at its distal end 204. The coil support portion 202 is configured to contain the actuator coil 124, thereby creating a mechanism for movement of the actuator arm 116 across the data disc 110. It is contemplated that the actuator coil 124 may be attached to the actuator arm 116 by adhesively bonding the actuator coil 124 to the actuator arm 116, over-molding the actuator coil 124 to the actuator arm 116, or by using other similar techniques.

The actuator arm 116 includes a head gimbal support portion 206 at its proximate end which receives the head gimbal assembly 118. In accordance with one embodiment of the present invention, the head gimbal assembly 118 may be swaged to a bottom surface 216 of the actuator arm 116. Alternatively, the head gimbal assembly 118 may be laser welded or screw mounted directly onto the actuator arm 116. As described below, at least one data transducer 120 is mounted to the head gimbal assembly 118 for writing and reading data to and from the data disc 110.

A pivot bearing support portion 210 is located between the proximate end 208 and the distal end 204 of the actuator arm 116, and is designed to receive a pivot bearing 212 and a bearing shaft 214. It is contemplated that the actuator arm 116 may serve as the bearing housing sleeve of the pivot bearing 212, thus retaining the bearings and eliminating the use of a separate bearing housing sleeve. It is contemplated that the pivot bearing 212 may be attached to the actuator arm 116 by adhesively bonding the pivot bearing 212 to the actuator arm 116, press-fitting the pivot bearing 212 to the actuator arm 116. Similarly, the bearing shaft 214 can be attached to the pivot bearing 212 by adhesively bonding the bearing shaft 214 to the pivot bearing 212, press-fitting the bearing shaft 214 to the pivot bearing 212.

As mentioned earlier, the circuit assembly 128 provides an electrical path for data signals from the data transducer 120 to the flex connector 134. The circuit assembly 128 includes the arm circuit 132 that amplifies signals which originate from the data transducer 120 and travel along the gimbal circuit 130. In general, the voltage levels of data signals passing from the data transducer 120 to the arm circuit 132 are extremely small (in the order of micro-volts). Consequently, relatively small amounts of noise introduced to such data signals can have a profound effect on the signal-to-noise ratio of these signals and degrade disc drive performance. Generally speaking, the noise level of data signals from the data transducer 120 to the arm circuit 132 is proportional to the distance traveled by the data signals from the data transducer 120 to the arm circuit 132. In other words, as the signal path from the data transducer 120 to the arm circuit 132 increases, the signal-to-noise ratio of the data signal decreases.

In accordance with one embodiment of the present invention, the arm circuit 132 is mounted on a top surface 218 of the actuator arm 116 along the circuit assembly 128. This "top-down" configuration of the arm circuit 132 on the actuator arm 116 brings the arm circuit 132 beneficially closer to the data transducer 120. By reducing the read/write signal transmission distance between the arm circuit 132 and the data transducer 120, less noise is introduced to the read/write signal. Consequently, overall disc drive performance is enhanced when the present invention is utilized.

The present invention may be further configured such that the gimbal circuit 130 is partially routed along the head gimbal assembly 118 and over the top surface 218 of the actuator arm 116. Coupling pads (not shown) on the gimbal circuit 130 and the arm circuit 132 may be used to electrically connect the data transducer 120 with the arm circuit 132. In another embodiment of the present invention, protruding integrated arm circuit guides 230 on the actuator arm 116 are utilized to secure, bend, and route a flexible ribbon lead portion 133 of the arm circuit 132 within the disc drive 102. The flexible ribbon lead portion 133 of the arm circuit electrically couples the signal conditioning portion 132 of the arm circuit to the flex connector 134 so that data signals can be communicated to and from the printed circuit board (not shown). The electrical circuit comprised of the gimbal circuit 130, the signal conditioning portion 132, the flexible ribbon lead portion 133, and the flex connector 134, electrically couples the data transducer 120 to the printed circuit board.

Figure 3:
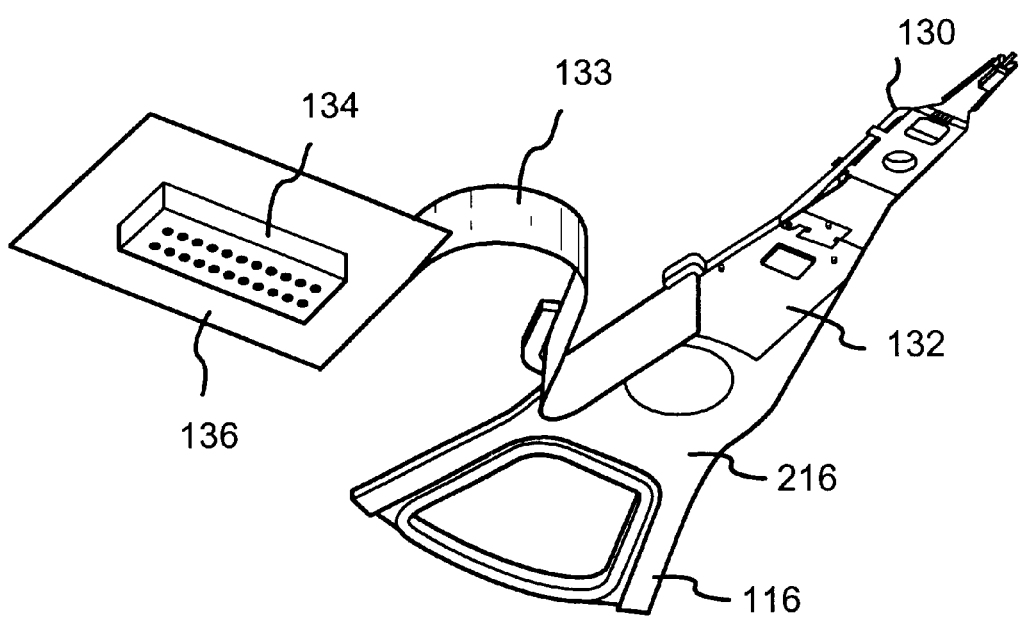
FIG. 3 shows another embodiment of the present invention with an arm circuit mounted on a bottom surface of an actuator arm.

In FIG. 3, an embodiment of the present invention is shown with the arm circuit 132 mounted on the bottom surface 216 of the actuator arm 116. In this embodiment, the advantageous placement of the arm circuit 132 proximate the data transducer 120, as described above, is also achieved. It is contemplated that the arm circuit 132 is fastened to the actuator arm 116 using mounting techniques known to those skilled in the art, including adhesive bonding, soldering, crimping, and screw fastening techniques.

Figure 4:
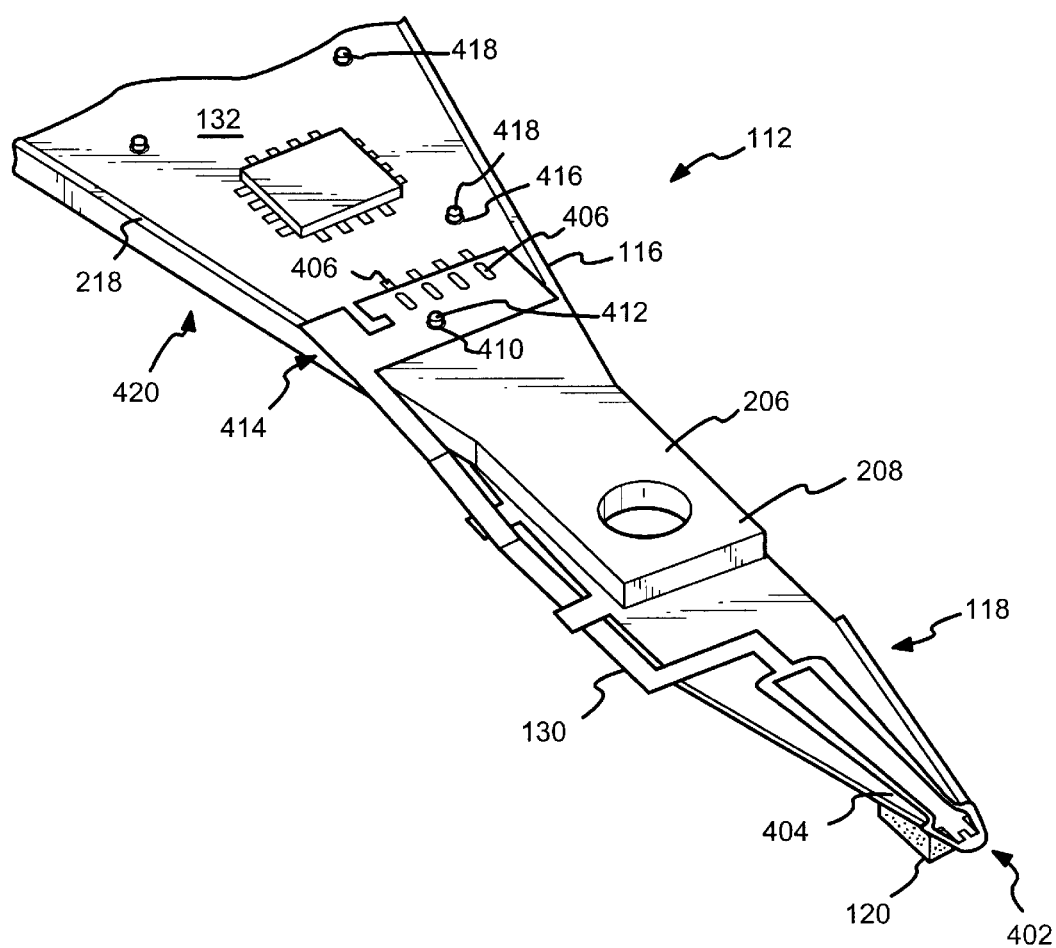
FIG. 4 shows a detailed view of the arm circuit and gimbal circuit of the actuator assemblies utilized in FIG. 2 and FIG. 3.

In FIG. 4, a detailed view of the arm circuit 132 and the gimbal circuit 130 is shown. A transducer portion 402 of the gimbal circuit 130 electrically couples the gimbal circuit 130 to the data transducer 120 and is disposed on a proximate end 404 of the head gimbal assembly 118. It is contemplated that the transducer portion 402 of the gimbal circuit 130 is chemically bonded or soldered to the proximate end 404 of the head gimbal assembly 118, however other fastening techniques known to those skilled in the art may be used. As shown, the transducer portion 402 of the gimbal circuit 130 may be forked about both sides of the data transducer 120, thereby providing equal balance around the data transducer 120.

From the proximate end 404 of the head gimbal assembly 118, the gimbal circuit 130 continues up the head gimbal assembly 118 and is partially routed along one side of the head gimbal assembly 118. At the head gimbal support portion 206 of the actuator arm 116, the gimbal circuit 130 is elevated and fastened over the actuator arm 116 and the arm circuit 132. Connecting pads 406 on the gimbal circuit 130 and the arm circuit 132 electrically couple the gimbal circuit 130 to the arm circuit 132. Unlike prior approaches, the arm circuit 132 is positioned at the proximate end 208 of the actuator arm 116, which improves read/write signal quality over prior approaches wherein the preamplifier is significantly farther from the transducer. Also, positioning the connecting pads 406 on the top surface of the actuator arm 116 allows for top-down assembly and automation of inter-connects attachment. Positioning the connecting pads 406 on the top surface 218 of the actuator arm 116 substantially eliminates the need to bend the gimbal circuit 130 surrounding the connecting pads 406 region as in the side-mounting approaches. Further to this, arm grooving features along the arm edges used in prior approaches for capturing and guiding the gimbal circuit can be eliminated. Similar advantages are achieved by mounting the connecting pads 406 on the bottom surface (216 of FIG. 3) of the actuator arm 116.

In another embodiment of the present invention, the actuator assembly 112 may include alignment pins 412 to help align the gimbal circuit 130 with the arm circuit 132. For example, the gimbal circuit 130 may include one or more gimbal circuit alignment apertures 410 which receive a gimbal circuit alignment pin 412 and aligns the gimbal circuit 130 to a gimbal circuit mounted position 414 on the top surface 218 of the elongated actuator arm 116. Likewise, the arm circuit 132 may include one or more arm circuit alignment apertures 416 which receive arm circuit alignment pins 418 to position and align the arm circuit 132 on the top surface 218 of the actuator arm 116 at an arm circuit mounted position 420. Utilizing the alignment apertures 410 and 416 and the alignment pins 412 and 418 helps ensure proper electrical connections between the gimbal circuit 130 and the arm circuit 132 along the connecting pads 406 during manufacturing of the actuator assembly 112.

Figure 5:
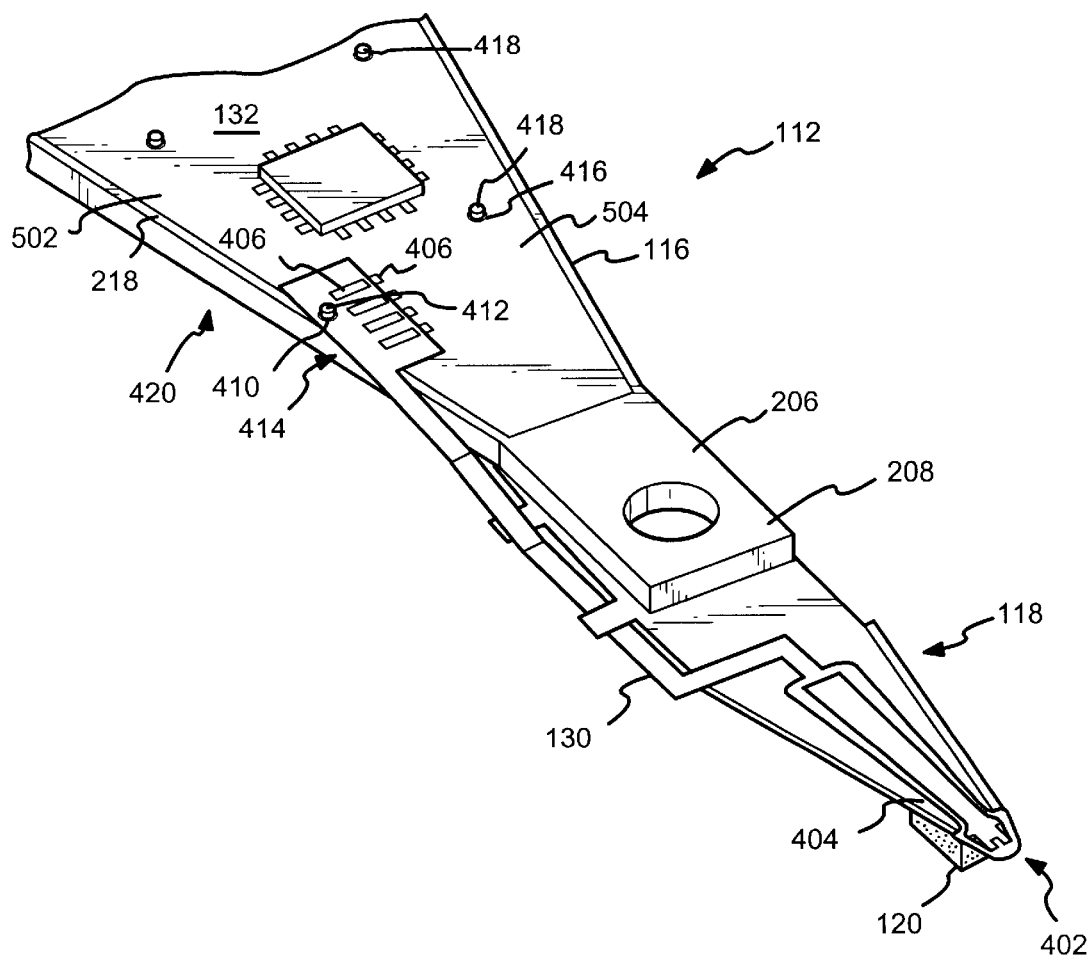
FIG. 5 shows another embodiment of the present invention having connecting pads oriented along one side of the arm circuit.

In FIG. 5, another embodiment of the present invention is shown. In this embodiment, the connecting pads 406 are oriented along a side of the arm 132. It is contemplated that the connecting pads 406 may be aligned along the left side 502, the right side 503, or a combination thereof. As described above, alignment pins 412 and 418 may also be utilized to help ensure proper electrical connections between the gimbal circuit 130 and the arm circuit 132 along the connecting pads 406 during manufacturing of the actuator assembly 112. As in the embodiment of FIG. 4, the arm circuit 132 is positioned at the proximate end 208 of the actuator arm 116, thereby improving the quality of read/write signals over prior approaches wherein the preamplifier is significantly farther from the transducer. Aligning the connecting pads 406 along the sides of the actuator arm 116, and positioning the connecting pads 406 on the top surface 218 or the bottom surface 216 of the actuator arm 116, allows for top-down assembly and automation of inter-connects attachment during the manufacturing process.

In summary, and in view of the foregoing discussion, it will be understood that one embodiment of the present invention provides an actuator assembly (such as 112) for reading and writing data from and to a data disc (such as 110). The actuator assembly (such as 112) includes an actuator arm (such as 116) rotatably mounted adjacent the data disc (such as 110). The actuator arm (such as 116) has a top surface (such as 218) and a bottom surface (such as 216), and includes a head gimbal assembly support portion (such as 206) located at a proximate end (such as 208) of the actuator arm (such as 116). The actuator assembly (such as 112) includes an arm circuit (such as 132) fastened to the top surface (such as 218) of the actuator arm (such as 116). The actuator assembly (such as 112) additionally includes an arm circuit alignment aperture (such as 416) on the arm circuit (such as 132) and an arm circuit alignment pin (such as 418) on the actuator arm (such as 116). The arm circuit alignment aperture (such as 416) receives the arm circuit alignment pin (such as 418) for positioning of the arm circuit (such as 132) on the top surface (such as 218) of the actuator arm (such as 116). The actuator assembly (such as 112) also includes an integrated arm circuit guide (such as 230) routing the arm circuit (such as 132).

In another embodiment, the actuator assembly (such as 112) includes a head gimbal assembly (such as 118). The head gimbal assembly (such as 118) is fastened to the head gimbal assembly support portion (such as 206) of the actuator arm (such as 116) and contains a data transducer (such as 120) for writing and reading data to and from the data disc (such as 110) Furthermore, the actuator assembly (such as 112) may include a gimbal circuit (such as 130) that electrically couples the data transducer (such as 120) and the arm circuit (such as 132). The gimbal circuit (such as 130) is partially routed along the head gimbal assembly (such as 118) and over the top surface (such as 218) of the actuator arm (such as 116). An embodiment may also include a gimbal circuit alignment aperture (such as 410) on the gimbal circuit (such as 130) and a gimbal circuit alignment pin (such as 412) on the actuator arm (such as 116). The gimbal circuit alignment aperture (such as 410) receives the gimbal circuit alignment pin (such as 412) for positioning of the gimbal circuit (such as 130) on the top surface (such as 218) of the actuator arm (such as 116). The head gimbal assembly (such as 118) can be swaged, laser-welded, or screw mounted to the actuator arm.

In another embodiment, the actuator arm (such as 116) includes a substantially V-shaped coil support portion (such as 204) located at a distal end (such as 202) of the actuator arm (such as 116). Furthermore, the actuator assembly (such as 112) includes an actuator coil (such as 124) fastened to the V-shaped coil support portion (such as 204) of the actuator arm (such as 116). The actuator coil (such as 124) may be adhesive-bonded or overmolded to the actuator arm (such as 116).

In another embodiment, the actuator arm (such as 116) includes a pivot bearing support portion (such as 210) located between the proximate end (such as 208) and the distal end (such as 202) of the actuator arm (such as 116). Additionally, the actuator assembly (such as 112) includes a pivot bearing (such as 212) coupled directly to the actuator arm (such as 116) at the pivot bearing support portion (such as 210).

In another embodiment, an actuator assembly (such as 112) for reading and writing data from and to a data disc (such as 110) is presented. The actuator assembly (such as 112) includes an actuator arm (such as 116) rotatably mounted adjacent the data disc (such as 110). The actuator arm (such as 116) has a top surface (such as 218) and bottom surface (such as 216), with an arm circuit (such as 132) mounted to the top surface (such as 218) of the actuator arm (such as 116). The actuator assembly (such as 112) further includes a head gimbal assembly (such as 118) operably connected to the actuator arm (such as 116) at the bottom surface (such as 216). The head gimbal assembly (such as 118) contains a data transducer (such as 120) for writing and reading data to and from the data disc (such as 110). In addition, a gimbal circuit (such as 130) is electrically coupled with the data transducer (such as 120) and the arm circuit (such as 132), and is partially positioned along the head gimbal assembly (such as 118) and partially positioned along the top surface (such as 218) of the actuator arm (such as 116). The actuator assembly (such as 112) includes one or more arm circuit alignment pins (such as 418) on the top surface (such as 218) of the actuator arm (such as 116) which are configured to align the arm circuit (such as 132) to an arm circuit mounted position (such as 420) on the top surface (such as 218) of the actuator arm (such as 116).

Alternatively, in another embodiment, the top surface (such as 218) of the actuator arm (such as 116) includes one or more gimbal circuit alignment pins (such as 412) configured to align the gimbal circuit (such as 130) to a gimbal circuit mounted position (such as 414) on the top surface (such as 218) of the actuator arm (such as 116).

Another embodiment includes an actuator assembly (such as 112) for reading and writing data from and to a data disc (such as 110) having an elongated actuator arm (such as 116) rotatably mounted adjacent the data disc (such as 110). The actuator arm (such as 116) includes a substantially V-shaped coil support portion (such as 204) located at a distal end (such as 202) of the actuator arm (such as 116), a head gimbal assembly support portion (such as 206) located at a proximate end (such as 208) of the actuator arm (such as 116), and a pivot bearing support portion (such as 212) located between the proximate end (such as 208) and the distal end (such as 202) of the actuator arm (such as 116). The actuator arm (such as 116) further includes a top surface (such as 218) and bottom surface (such as 216). The actuator assembly (such as 112) also comprises an arm circuit (such as 132) fastened to the top surface (such as 218) of the actuator arm (such as 116) between the pivot bearing support portion (such as 212) and the head gimbal assembly support portion (such as 206).

The actuator assembly (such as 112) may additionally include an arm circuit alignment aperture (such as 416) on the arm circuit (such as 132) and an arm circuit alignment pin (such as 418) on the actuator arm (such as 116). The arm circuit alignment aperture (such as 416) receives the arm circuit alignment pin (such as 418) for positioning of the arm circuit (such as 132) on the top surface (such as 218) of the actuator arm (such as 116).

In another embodiment, the actuator assembly (such as 112) includes a head gimbal assembly (such as 118). The head gimbal assembly (such as 118) contains a data transducer (such as 120) for writing and reading data to and from the data disc (such as 110), and is fastened to the head gimbal assembly support portion (such as 206) of the actuator arm (such as 116). Additionally, the actuator assembly (such as 112) may include a gimbal circuit (such as 130) that electrically couples the data transducer (such as 120) with the arm circuit (such as 132). The gimbal circuit (such as 130) is partially routed along the head gimbal assembly (such as 118) and over the top surface (such as 218) of the actuator arm (such as 116). An embodiment may also include a gimbal circuit alignment aperture (such as 410) on the gimbal circuit (such as 130) and a gimbal circuit alignment pin (such as 412) on the actuator arm (such as 116). The gimbal circuit alignment aperture (such as 410) receives the gimbal circuit alignment pin (such as 412) for positioning of the gimbal circuit (such as 130) on the top surface (such as 218) of the actuator arm (such as 116).

In yet another embodiment, an actuator assembly (such as 112) is configured for reading and writing data from and to a data disc (such as 110). The actuator assembly (such as 112) includes an elongated actuator arm (such as 116) rotatably mounted adjacent the data disc (such as 110). The actuator arm (such as 116) includes a substantially V-shaped coil support portion (such as 204) located at a distal end (such as 202) of the actuator arm (such as 116), a head gimbal assembly support portion (such as 206) located at a proximate end (such as 208) of the actuator arm (such as 116), and a pivot bearing support portion (such as 210) located between the proximate end (such as 208) and the distal end (such as 202) of the actuator arm (such as 116). The actuator assembly (such as 112) further includes an arm circuit (such as 132) fastened to the bottom surface (such as 216) of the actuator arm (such as 116). The actuator assembly (such as 112) also includes an arm circuit alignment aperture (such as 416) on the arm circuit (such as 132) and an arm circuit alignment pin (such as 418) on the actuator arm (such as 116). The arm circuit alignment aperture (such as 416) receives the arm circuit alignment pin (such as 418) for positioning of the arm circuit (such as 132) on the bottom surface (such as 216) of the actuator arm (such as 116).

In addition, the actuator assembly (such as 112) may include a head gimbal assembly (such as 118) with a data transducer (such as 120) for writing and reading data to and from the data disc (such as 110). The head gimbal assembly (such as 120) is fastened to the head gimbal assembly support portion (such as 206) of the actuator arm (such as 116). A gimbal circuit (such as 130) can be used to electrically couple the data transducer (such as 120) and the arm circuit (such as 132), and is partially routed along the head gimbal assembly (such as 118) and under the bottom surface (such as 216) of the actuator arm (such as 116). Moreover, an embodiment may include a gimbal circuit alignment aperture (such as 410) on the gimbal circuit (such as 130) and a gimbal circuit alignment pin (such as 412) on the actuator arm (such as 116). The gimbal circuit alignment aperture (such as 410) receives the gimbal circuit alignment pin (such as 412) for positioning of the gimbal circuit (such as 130) along the bottom surface (such as 216) of the actuator arm (such as 116).

It will be clear that the present invention is well adapted to attain the ends and advantages mentioned as well as those inherent therein. While the presently preferred embodiments have been described for purposes of this disclosure, various changes and modifications may be made which are well within the scope of the present invention. For example, the present invention may be adapted for use in an optical disc drive configuration, such as a Compact Disk (CD) or Digital Versatile Disk (DVD). Thus, numerous other changes, combinations, and arrangements of techniques may be made which will readily suggest themselves to those skilled in the art and which are encompassed in the spirit of the invention disclosed and as defined in the appended claims.

What is claimed is:

1. An actuator assembly for reading and writing data from and to a data storage disc in a disc drive, the actuator assembly comprising:

an actuator arm rotatably mounted adjacent the data disc, the arm having a top surface and a bottom surface and an arm circuit alignment pin projecting from one of the surfaces of the actuator arm, the actuator arm including a head gimbal assembly support portion located at one end of the actuator arm; and an arm circuit fastened to one of the surfaces of the actuator arm, wherein the arm circuit has an arm circuit alignment aperture receiving the arm circuit alignment pin to position the arm circuit on one of the surfaces at the one end of the actuator arm that includes the head gimbal assembly support portion.

2. The actuator assembly of claim 1, further comprising a head gimbal assembly fastened to the head gimbal assembly support portion of the actuator arm, the head gimbal assembly carrying a data transducer for writing and reading data to and from the data disc.

3. The actuator assembly of claim 2, further comprising a gimbal circuit electrically coupling the data transducer to the arm circuit, the gimbal circuit being partially routed along the head gimbal assembly and over the surface of the actuator arm to which the arm circuit is fastened.

4. The actuator assembly of claim 3, further comprising:

the gimbal circuit having a gimbal circuit alignment aperture; and a gimbal circuit alignment pin projecting from the actuator arm, wherein the gimbal circuit alignment aperture receives the gimbal circuit alignment pin to position the gimbal circuit over the surface of the actuator arm.

5. The actuator assembly of claim 4, wherein the arm circuit is electrically connected to the gimbal circuit on the one end of the actuator arm.

6. The actuator assembly of claim 1, wherein the arm circuit is fastened to the top surface of the actuator arm.

7. The actuator assembly of claim 6, further comprising a head gimbal assembly fastened to the head gimbal assembly support portion of the actuator arm, the head gimbal assembly carrying a data transducer for writing and reading data to and from the data disc.

8. The actuator assembly of claim 7, further comprising a gimbal circuit electrically coupling the data transducer to the arm circuit, the gimbal circuit being partially routed along the head gimbal assembly and over the surface of the actuator arm to which the arm circuit is fastened.

9. The actuator assembly of claim 8, further comprising:

the gimbal circuit having a gimbal circuit alignment aperture; and a gimbal circuit alignment pin projecting from the actuator arm, wherein the gimbal circuit alignment aperture receives the gimbal circuit alignment pin to position the gimbal circuit over the surface of the actuator arm.

10. The actuator assembly of claim 1, wherein the arm circuit is fastened to the bottom surface of the actuator arm.

11. The actuator assembly of claim 10, further comprising a head gimbal assembly fastened to the head gimbal assembly support portion of the actuator arm, the head gimbal assembly carrying a data transducer for writing and reading data to and from the data disc.

12. The actuator assembly of claim 11, further comprising a gimbal circuit electrically coupling the data transducer to the arm circuit, the gimbal circuit being partially routed along the head gimbal assembly and over the surface of the actuator arm to which the arm circuit is fastened.

13. The actuator assembly of claim 12, wherein the arm circuit is electrically connected to the gimbal circuit on the one end of the actuator arm.

14. The actuator assembly of claim 12, further comprising:

the gimbal circuit having a gimbal circuit alignment aperture; and a gimbal circuit alignment pin projecting from the actuator arm, wherein the gimbal circuit alignment aperture receives the gimbal circuit alignment pin to position the gimbal circuit over the surface of the actuator arm.

15. In a disc drive, an actuator assembly for reading and writing data from and to a data disc, the actuator assembly comprising:

an actuator arm rotatably mounted adjacent the data disc, the actuator arm having a top surface and a bottom surface, the top surface of the actuator arm including one or more arm circuit alignment pins located at one end of the actuator arm;

an arm circuit mounted to the top surface of the actuator arm and aligned to an arm circuit mounted position on the top surface of the actuator arm via the arm circuit alignment pins;

a head gimbal assembly operably connected to the one end of the actuator arm at the bottom surface and including a data transducer for writing and reading data to and from the data disc; and a gimbal circuit electrically coupled with the data transducer and the arm circuit, the gimbal circuit being partially positioned along the head gimbal assembly and partially positioned along the top surface and approximate to the one end of the actuator arm operably connected to the head gimbal assembly.

16. The actuator assembly of claim 15, wherein the top surface of the actuator arm includes one or more gimbal circuit alignment pins configured to align the gimbal circuit to a gimbal circuit mounted position on the top surface of the actuator arm.

17. The actuator assembly of claim 15, wherein the head gimbal assembly is laser-welded to the actuator arm.

18. The actuator assembly of claim 15, wherein the head gimbal assembly is screw mounted to the actuator arm.

19. The disc drive of claim 15, further comprising an actuator coil operably coupled to the actuator arm.

20. The actuator assembly of claim 19, wherein the actuator coil is adhesive-bonded to the actuator arm.

21. The actuator assembly of claim 15, wherein the actuator arm includes a pivot bearing support portion located between the one end operably connected to the head gimbal assembly and another end of the actuator arm, and the actuator assembly further comprises a pivot bearing coupled directly to the actuator arm at the pivot bearing support portion.

22. The actuator assembly of claim 21, wherein the pivot bearing is adhesively bonded to the pivot bearing support portion of the actuator arm.

23. The actuator assembly of claim 21, wherein the pivot bearing is press-fit to the pivot bearing support portion of the actuator arm.

24. An actuator assembly in a disc drive, the disc drive including a data disc for storing data and a flex connector for communicating data signals to a printed circuit board, the actuator assembly comprising:

an actuator arm having a top surface and a bottom surface rotatably mounted adjacent the data disc, the actuator arm including a substantially V-shaped coil support portion located at a distal end of the actuator arm, a head gimbal assembly support portion located at a proximate end of the actuator arm, and a pivot bearing support portion located between the proximate end and the distal end of the actuator arm;

a head gimbal assembly carrying a data transducer for writing and reading data to and from the data disc, the head gimbal assembly being fastened to a head gimbal assembly support portion; and means for electrically coupling the data transducer to the flex connector, wherein the means is located on the top surface or the bottom surface at the proximate end of the actuator arm.

25. The actuator assembly of claim 24 wherein the means for electrically coupling includes a signal conditioning portion fastened to either the top surface or the bottom surface of the actuator arm.

26. The actuator assembly of claim 25 wherein the signal conditioning portion is operable to amplify data signals received from the data transducer.

27. The actuator assembly of claim 26, wherein the signal conditioning portion comprises:

an arm circuit fastened to the top surface of the actuator arm between the pivot bearing support portion and the head gimbal assembly support portion, the arm circuit having an arm circuit alignment aperture receiving an arm circuit alignment pin projecting from the top surface of the actuator arm to position the arm circuit on the top surface of the actuator arm.

28. The actuator assembly of claim 26, wherein the signal conditioning portion is an arm circuit fastened to the bottom surface of the actuator arm, the arm circuit having an arm circuit aperture receiving an arm circuit alignment pin projecting from the bottom surface of the actuator arm to position the arm circuit on the bottom surface of the actuator arm.

29. The actuator assembly of claim 28, further comprising a gimbal circuit electrically coupling the data transducer to the arm circuit, the gimbal circuit being partially routed along the head gimbal assembly and under the bottom surface of the actuator arm.

30. The actuator assembly of claim 29, further comprising:

a gimbal circuit alignment aperture on the gimbal circuit; and a gimbal circuit alignment pin on the actuator arm, wherein the gimbal circuit alignment aperture receives the gimbal circuit alignment pin for positioning of the gimbal circuit under the bottom surface of the actuator arm.

* * * * *